United States Patent
Pasala et al.

(10) Patent No.: US 9,323,650 B2
(45) Date of Patent: Apr. 26, 2016

(54) METHODS FOR GENERATING SOFTWARE TEST INPUT DATA AND DEVICES THEREOF

(71) Applicant: Infosys Limited, Bangalore (IN)

(72) Inventors: Anjaneyulu Pasala, Bangalore (IN); Sharal Nisha Dsouza, Mangalore (IN); Manuel Araoz, Buenos Aires (AR)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 13/945,672

(22) Filed: Jul. 18, 2013

(65) Prior Publication Data

US 2014/0026125 A1    Jan. 23, 2014

(30) Foreign Application Priority Data

Jul. 23, 2012   (IN) ............................. 3012/CHE/2012

(51) Int. Cl.
*G06F 9/44* (2006.01)
*G06F 11/36* (2006.01)

(52) U.S. Cl.
CPC .................................. *G06F 11/3684* (2013.01)

(58) Field of Classification Search
CPC ................................................... G06F 11/3684
USPC .................................................. 717/120–135
See application file for complete search history.

(56) References Cited

U.S. PATENT DOCUMENTS

| | | | |
|---|---|---|---|
| 5,542,043 A | 7/1996 | Cohen et al. | |
| 5,913,023 A * | 6/1999 | Szermer | 714/38.1 |
| 6,321,376 B1 * | 11/2001 | Willis et al. | 717/124 |
| 7,237,231 B2 | 6/2007 | Lambert | |
| 7,644,334 B2 | 1/2010 | Hickman et al. | |
| 7,926,114 B2 | 4/2011 | Neystadt et al. | |
| 7,958,495 B2 | 6/2011 | Kelso | |
| 7,979,846 B2 | 7/2011 | Grechanik et al. | |
| 2007/0038977 A1 * | 2/2007 | Savage | 717/106 |
| 2010/0037210 A1 * | 2/2010 | Okada | 717/125 |
| 2012/0192153 A1 * | 7/2012 | Venkatraman et al. | 717/124 |
| 2012/0254665 A1 * | 10/2012 | Pasala et al. | 714/33 |
| 2014/0157052 A1 * | 6/2014 | Campbell et al. | 714/32 |

FOREIGN PATENT DOCUMENTS

WO    2005106649 A2    11/2005

OTHER PUBLICATIONS

Offutt et al., Generating test data from SOFL specifitions, 1999 Elsevier Science Inc., pp. 49-62.*
Dalal et al., Model-Based Testing in Practice, ICSE '99 Los Angeles AC, ACM, pp. 285-294.*

(Continued)

*Primary Examiner* — Satish Rampuria
(74) *Attorney, Agent, or Firm* — LeClairRyan, a Professional Corporation (57) ABSTRACT

A method, non-transitory computer readable medium, and apparatus that extracts a plurality of attributes from a software requirements specification wherein each attribute is associated with a data type and one or more properties. Constraint representation syntax is applied to the extracted attributes based on the data type and the one or more properties associated with each attribute to generate a plurality of constraints, wherein the constraint representation syntax is a machine readable format. Each of the plurality of constraints is output and optionally associated with one or more nodes of a specification requirements model.

15 Claims, 5 Drawing Sheets

(56) References Cited

OTHER PUBLICATIONS

Offutt et al., Generating test data from state-based specifications, Software Testing, Verification and Reliability Softw. Test. Verif. Reliab., John Wiley & Sons, Ltd., 2003; pp. 25-53.*

Cardelli, Luca, and Peter Wegner. "On understanding types, data abstraction, and polymorphism." ACM Computing Surveys (CSUR) 17.4 (1985), pp. 471-523.*

Guttag, John V., Ellis Horowitz, and David R. Musser. "Abstract data types and software validation." Communications of the ACM 21.12 (1978): pp. 1048-1064.*

Visser, Eelco. "Stratego: A language for program transformation based on rewriting strategies system description of stratego 0.5." Rewriting techniques and applications. Springer Berlin Heidelberg, 2001. pp. 357-361.*

Bashir et al. "Automated Model Based Software Test Data Generation System," International Conference on Emerging Technologies, IEEE-ICET, pp. 275-279 (Oct. 18-19, 2008).

Zhao et al., "Automatic Test Generation for Dynamic Data Structures", 5th ACIS International Conference on Software Engineering Research, Management & Applications, pp. 545-549 (2007).

Mahmood, S., "A Systematic Review of Automated Test Data Generation Techniques", Blenkinge Institute of Technology (Oct. 2007) source: http://www.bth.se/fou/cuppsats.nsf/all/f3f9831872e2f373c12573a0003e6b44/$file/shahidMTSE2007-26.pdf.

Edvardsson, J., "A Survey on Automatic Test Data Generation," Proceedings of the Second Conference on Computer Science and Engineering, pp. 21-28, (Oct. 1999).

Gupta et al., "Generating Test Data for Branch Coverage", 15th IEEE International Conference on Automated Software Engineering, pp. 219 (2000).

Korel, B., "Automated Software Test Data Generation", IEEE transactions on Software Engineering, 16(8):870-879 (Aug. 1990).

Gupta et al., "UNA Based Iterative Test Data Generation and Its Evaluation", Proceedings of the 14th IEEE International Conference on Automated Software Engineering, pp. 224 (1999).

Clarke, L.A., "A System to Generate Test Data and Symbolically Execute Programs", Software Engineering, IEEE Transactions, vol. SE—2(3), pp. 215-222 (Sep. 1976).

WeiBleder et al., "Automatic Test Generation from Coupled UML Models using Input Partitions", MoDeVVA—4th Int. Workshop on Model-Driven Engineering, Verification and Validation (Oct. 2007).

Bin et al., "Automatic Test Data Generation Tool Based on Genetic Simulated Annealing Algorithm", Proceedings of the 2007 International Conference on Computational Intelligence and Security Workshops, pp. 183-186, (2007).

Deason et al., "A Rule-Based Software Test Data Generator", IEEE Transactions on Knowledge and Data Engineering, 3(1):1041-4347 (Mar. 1991).

Gotlieb et al., "Automatic Test Data Generation using Constraint Solving Techniques", ACM SIGSOFT Software Engineering, pp. 53-62 (Mar. 1998).

Wang et al., "An Adaptive Framework for Test Data Generation from Business Specification," International Conference on Information Technology and Computer Science (2009).

Wang et al., "Test Data Generation for Derived Types in C Program," Third IEEE International Symposium on Theoretical Aspects of Software Engineering (2009).

Utting et al., "A Taxonomy of Model-Based Testing," Working Paper Series ISSN 1170-487X, pp. 1-17 (Apr. 2006).

"TTmodeler—Model-Based Testing with UTP and TTCN-3," source: http://www.testingtech.com/products/ttplugins_modeler.php, retrieved on Mar. 12, 2012.

Salima et al., Enhancing the Efficiency of Regression Testing through Intelligent Agents, in the Proceedings of the Conference on Computational Intelligence and Multimedia Applications, pp. 103-108 (2007).

Jones, E.L., "Integrating Testing into the Curriculum—Arsenic in Small Doses," ACM SIGCSE Bulletin, vol. 33 (1):337-341 (2001).

Gorthi et al., Model-Based Automated Test Case Generation, SETLabs Briefings, vol. 6, No. 1, pp. 39-46 (2008).

Dalal et al., "Model-Based Testing in Practice," to appear in Proceedings of ICSE '99 (ACM Press) 10 pp. (1999).

Dai, Z.R., "Model-Driven Testing with UML 2.0," Computing Laboratory, University of Kent, 9 pp. (2004).

* cited by examiner

| Test Scenario/ Case Number | Test Step Number | User Input | Conditions | Expected system Output | Test Data | Remarks |
|---|---|---|---|---|---|---|
| 1 | 1 | User enters password. | Password <C> A[5-8, C[3-5,ncr], N[1-2,ncr], S[1,i(#,$,%,^,*,@,&)]] = Yes | | Password = 6z2w%Mm<br>Password = 'e2si<br>Password = E2@S8dTg<br>Password = 0NZS^g1x<br>Password = cvW^4<br>Password = %6Qlr | |
| | 2 | User enters the value for 'X' and 'Y' | 0 < X < 100 = Yes, 0 < Y < 200 = Yes, X > Y = Yes | Enter value for 'X' and 'Y' | X = 8, Y = 5<br>X = 99, Y = 85<br>X = 31, Y = 24<br>X = 44, Y = 14<br>X = 75, Y = 69<br>X = 13, Y = 6 | |
| 2 | 1 | User enters password. | Password <C> A[5-8, C[3-5,ncr], N[1-2,ncr], S[1,i(#,$,%,^,*,@,&)]] = Yes | | Password = 6z2w%Mm<br>Password = 'e2si<br>Password = E2@S8dTg<br>Password = 0NZS^g1x<br>Password = cvW^4<br>Password = %6Qlr | |
| | 2 | User enters the value for 'X' and 'Y' | 0 < X < 100 = Yes, 0 < Y < 200 = Yes, X > Y = No | Enter value for 'X' and 'Y' | X = 10, Y = 21<br>X = 90, Y = 179<br>X = 46, Y = 176<br>X = 80, Y = 100<br>X = 40, Y = 87<br>X = 9, Y = 7 | |
| 3 | 1 | User enters password. | Password <C> A[5-8, C[3-5,ncr], N[1-2,ncr], S[1,i(#,$,%,^,*,@,&)]] = No | Password does not conform to the complexity requirements. Please try again. | Password = FU<br>Password = OP'0rL<br>Password = +vFrJ7m#G}<br>Password = E{'6RY3<br>Password = n%4&OnM | |

FIG. 5

METHODS FOR GENERATING SOFTWARE TEST INPUT DATA AND DEVICES THEREOF

This application claims the benefit of Indian Patent Application Filing No. 3012/CHE/2012, filed Jul. 23, 2012, which is hereby incorporated by reference in its entirety.

FIELD

This technology generally relates to software testing and, more particularly, to methods and devices for generating software test input data.

BACKGROUND

Software testing accounts for a substantial portion of the software development life cycle as well as the total cost of a software development project. Software testing can include test scenario creation, test input data creation, and test execution. Effective software testing is critical to providing high quality software that meets established functional requirements and is free of bugs and defects.

Meaningful and exhaustive test input data sets can increase the effectiveness of software testing. However, currently, test input data is often manually created through an expensive process that requires significant resources and time and that is susceptible to error. Additionally, current techniques often produce test input data that is not comprehensive with respect to the possible data types and/or properties of the software input variables.

SUMMARY

A method for generating software test input data includes extracting, with a test data generation computing apparatus, a plurality of attributes from a software requirements specification wherein each attribute is associated with a data type and one or more properties. Machine-readable constraint representation syntax is applied, with the test data generation computing apparatus, to the extracted attributes based on the data type and the one or more properties associated with each attribute to generate a plurality of constraints. Each of the plurality of constraints is output with the test data generation computing apparatus.

An apparatus for generating software test input data includes a processor coupled to a memory and configured to execute programmed instructions stored in the memory including extracting a plurality of attributes from a software requirements specification wherein each attribute is associated with a data type and one or more properties. Machine-readable constraint representation syntax is applied to the extracted attributes based on the data type and the one or more properties associated with each attribute to generate a plurality of constraints. Each of the plurality of constraints is output A non-transitory computer readable having stored thereon instructions for generating software test input data comprising machine executable code which when executed by a processor, causes the processor to perform steps including extracting a plurality of attributes from a software requirements specification wherein each attribute is associated with a data type and one or more properties. Machine-readable constraint representation syntax is applied to the extracted attributes based on the data type and the one or more properties associated with each attribute to generate a plurality of constraints. Each of the plurality of constraints is output This technology provides a number of advantages including methods, non-transitory computer readable medium, and devices that automatically generate exhaustive software test input data based on a requirement specification for the software. With this technology, test input data for a plurality of attribute or input variable data types and properties can be generated. The generated test input data can then be utilized to more effectively test the software. As a result, resources required to generate comprehensive software test input data and thoroughly test software are reduced and software quality is improved.

DETAILED DESCRIPTION

Figure 1:
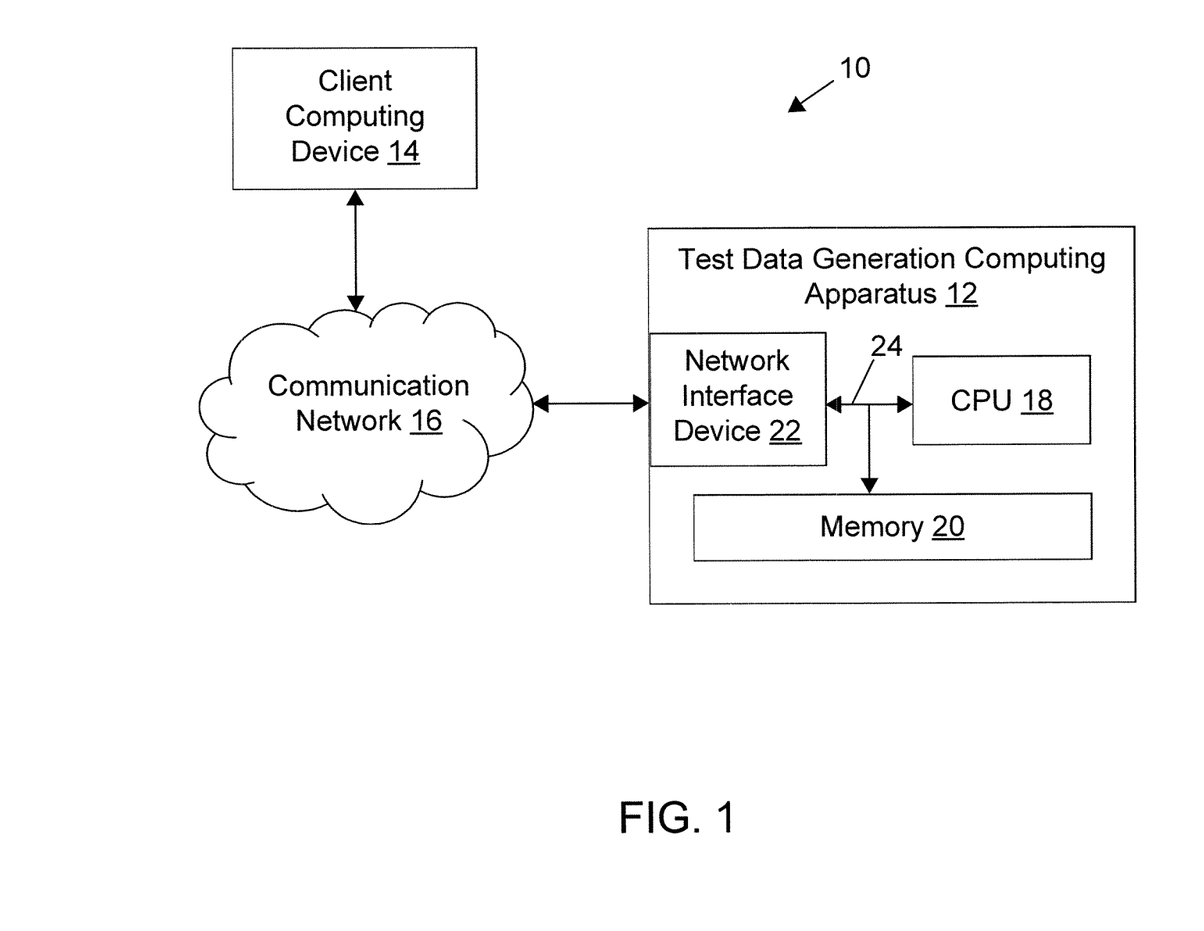
FIG. 1 is a block diagram of a network environment which incorporates an exemplary test data generation computing apparatus for generating software test input data.

A network environment 10 with an exemplary test data generation computing apparatus 12 is illustrated in FIG. 1. The environment 10 includes the test data generation computing apparatus 12 and a client computing device 14, coupled together by one or more communication networks 16, although this environment 10 can include other numbers and types of systems, devices, components, and elements in other configurations, such as multiple numbers of each of these apparatuses and devices. This technology provides a number of advantages including methods, non-transitory computer readable medium, and devices that more effectively generate software test input data.

The test data generation computing apparatus 12 includes a central processing unit (CPU) or processor 18, a memory 20, and a network interface device 22 which are coupled together by a bus 24 or other link, although other numbers and types of systems, devices, components, and elements in other configurations and locations can be used. The processor 18 in the test data generation computing apparatus 12 executes a program of stored instructions for one or more aspects of the present technology as described and illustrated by way of the examples herein, although other types and numbers of processing devices and logic could be used and the processor could execute other numbers and types of programmed instructions.

The memory 20 in the test data generation computing apparatus 12 stores these programmed instructions for one or more aspects of the present technology as described and illustrated herein. However, some or all of the programmed instructions and database could be stored and/or executed elsewhere such as at the client computing device 14, for example. A variety of different types of memory storage devices, such as a random access memory (RAM) and/or read only memory (ROM) in the test data generation computing apparatus 12 or a floppy disk, hard disk, CD ROM, DVD ROM, or other computer readable medium which is read from and written to by a magnetic, optical, or other reading and writing system that is coupled to the processor 18 in the test data generation computing apparatus 12, can be used for the memory 20.

In one example, the network interface device 22 of the test data generation computing apparatus 12 operatively couples and facilitates communication between the test data generation computing apparatus 12 and the client computing device 14 via the communications network 16, although other types and numbers of communication networks or systems with other types and numbers of connections and configurations can be used. By way of example only, the communications network could use TCP/IP over Ethernet and industry-standard protocols, including NFS, CIFS, SOAP, XML, LDAP, and/or SNMP, although other types and numbers of communication networks, such as a direct connection, a local area network, a wide area network, each having their own communications protocols, can be used.

The client computing device can include a central processing unit (CPU) or processor, a memory, a network interface device, and an input and/or display device interface, which are coupled together by a bus or other link, although other numbers and types of network devices could be used. The client computing device may run interface applications that provide an interface to make requests for and send content and/or data to different applications or services provided by the test data generation computing apparatus 12 via the communication network 16.

Although examples of the test data generation computing apparatus 12 are described herein, it is to be understood that the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

An exemplary method for generating software test input data will now be described with reference to FIGS. 1-5. In this particular example, in step 200, the test data generation computing apparatus 12 extracts a plurality of attributes from a software requirements specification. In one example, the test data generation computing apparatus 12 obtains the software requirements specification, such as submitted by a user of the client device 14 and/or stored in memory 20, for example, and parses the software requirements specifications to identify and extract all of the attributes or input variables and their associated data types and other properties.

Figure 2:
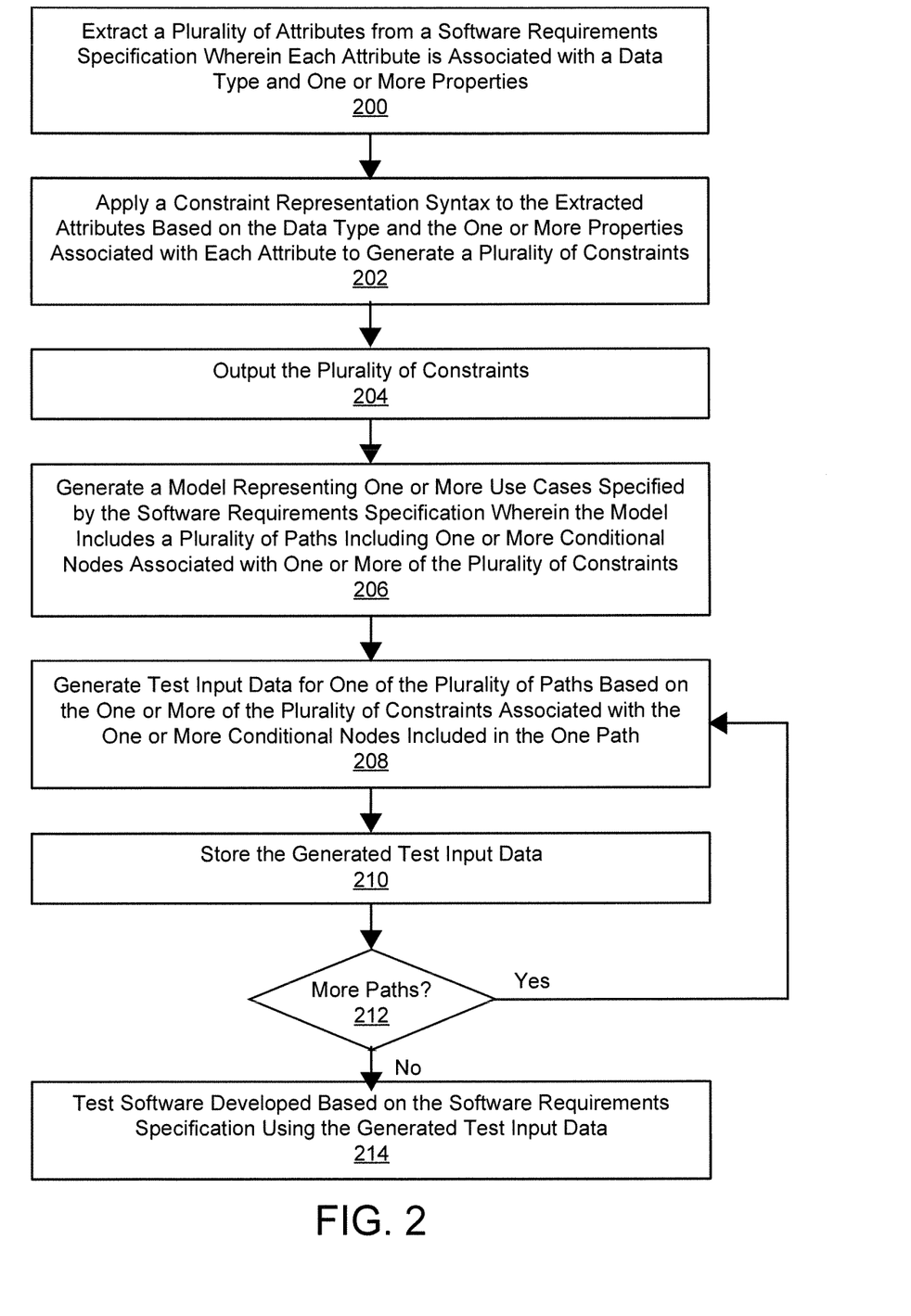
FIG. 2 is a flowchart of an exemplary method for generating software test input data.

At step 202, the test data generation computing apparatus 12 generates a plurality of constraints by applying constraint representation syntax to the extracted attributes based on the data type and the properties associated with each attribute. One exemplary constraint representation syntax including a machine readable format is described herein, although other syntaxes can be used. In some examples, the test data generation computing apparatus 12 parses the software requirements specifications to extract the attributes and the data types and/or properties of the attributes.

In other examples, the test data generation computing apparatus 12 generates the plurality of constraints based on information obtained from a user of the client computing device 14 including the attributes, and/or data types or properties of the attributes, as specified in the software requirements specification. Additionally, in some examples, the plurality of constraints can be generated by the test data generation computing apparatus 12 based on information obtained from a user of the client computing device 14 including one or more representations of the data types and/or properties of the attributes specified based on the constraint representation syntax.

Figure 3:
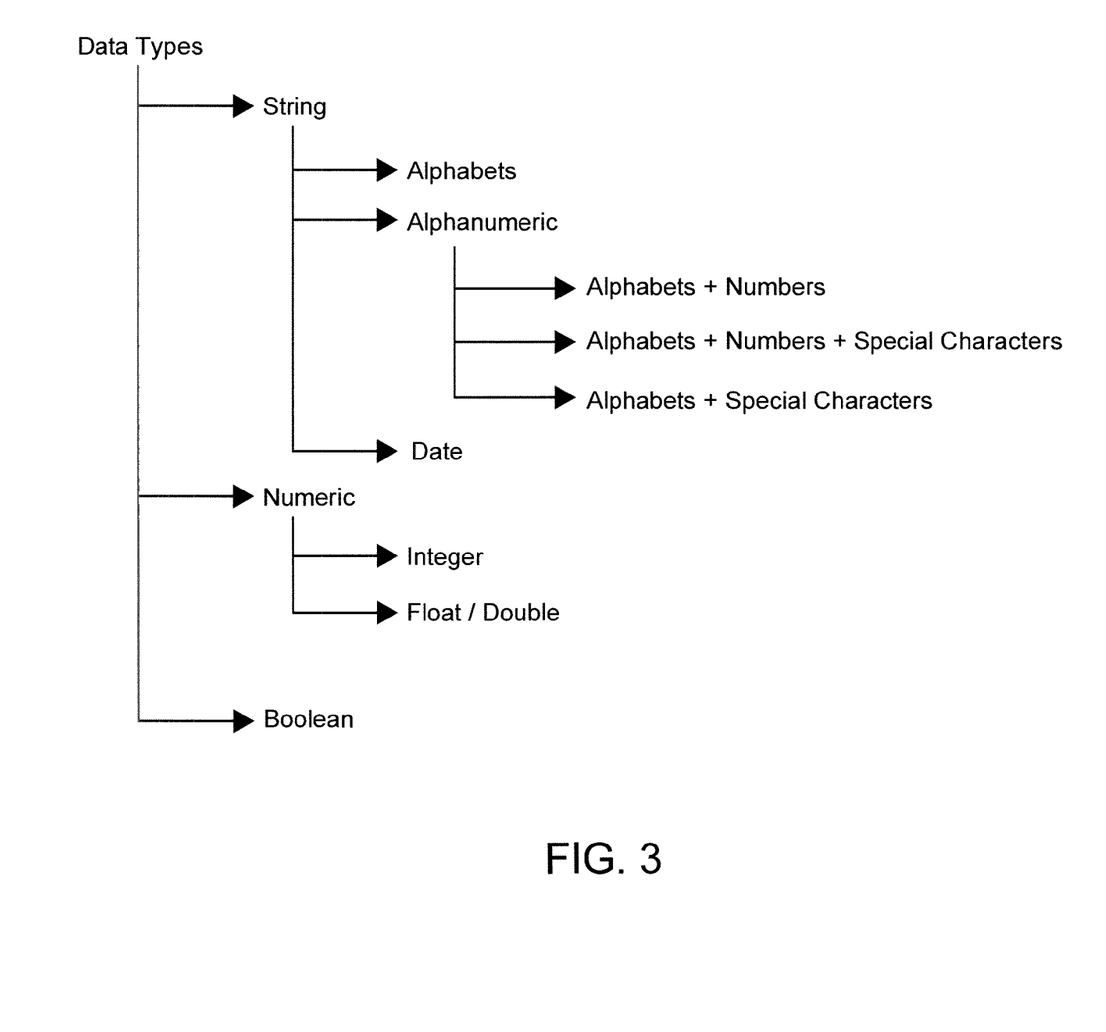
FIG. 3 is a diagram of an exemplary data type hierarchy used to define an exemplary constraint representation syntax used in the exemplary method for generating software test input data of FIG. 2.

Referring to FIG. 3, a diagram of an exemplary data type hierarchy used to define the exemplary constraint representation syntax is shown. The hierarchy includes string, numeric, and Boolean data types as well as subtypes including alphabets, alphanumeric, and date for the string data type, alphabets and numbers, alphabets numbers and special characters, and alphabets and special characters for the alphanumeric subtype of the string data type, and integer and float or double for the numeric data type.

In this example, each of the string and numeric subtypes are associated with an identifier such as one or more of the exemplary identifiers shown Table 1, although other numbers and types of identifiers can be used.

TABLE 1

| Identifier | Description of Representation of the Identifier |
| --- | --- |
| A | Alphanumeric string |
| C | Character string consisting of alphabets only |
| CC | Character string consisting of uppercase alphabets only |
| CS | Character string consisting of lowercase alphabets only |
| N | Numeric or number type [integer and decimal/float/double] |
| S | Special characters allowed in the alphanumeric strings |
| D | Date string |

In this exemplary constraint representation syntax, the properties of an attribute of a numeric data type can be represented as "N [Int, Deci]", where "N" is defined in Table 1, "Int" represents a total number of digits and the optional "Deci" represents a number of digits in a fractional part in the case of a decimal number. Additionally, the properties of an attribute of a numeric data type are represented as "−N" in the case of negative values.

Accordingly, in one exemplary application of the exemplary constraint representation syntax to an attribute of a numeric data type, "N [5, 0]" or "N [5]" represents an integer number with five digits in length. In another example, "N [5, 2]" represents a decimal number with five digits in length in which the integer part is three digits and the fractional part is two digits. Additionally, in this example, the decimal point is not counted as a part of the length. In yet another example, a decimal value less than 1 but more than 0 (e.g. 0.99) and less than 0 but more than −1 (e.g. −0.99) can be represented as "N[2,2]" and "−N[2, 2]", respectively, because they each have two total digits, each of which is a fractional part of the positive or negative decimal number.

In this exemplary constraint representation syntax, the properties of an attribute of a date data type can be represented as "D [DD/MM/YYYY]", "D [DD-MM-YYYY]", "D [DD/MM/YY]", "D [DD-MM-YY]", "D [MM/DD/YYYY]", "D [MM-DD-YYYY]", "D [MM/DD/YY]", and/or "D [MM-DD-YY]", where "D" is defined in Table 1, "DD" represents a day, "MM" represents a month, and "YYYY" or "YY" represents a year in numerical format.

In this exemplary constraint representation syntax, the properties of an attribute of a string data type can be represented as "A/C[Total_Length_Of_Attribute, String1[ ], String2[ ], String3[ ], . . . Stringn[ ]]", where each of String1-n[ ] can be represented as "C/CC/CS/N/S [Length Include Not-Include Position]" and where "A", "C", "CC", "CS", "N", and "S" are defined in Table 1. In this example, the alphanumeric string subtype consists of characters, numbers, and special characters and the alphabets string subtype consists of both lowercase and uppercase letters of the character set A-Z. Accordingly, if the representation is prefixed with an "A", it represents an alphanumeric string and, if prefixed with a "C", it represents a character or alphabets string.

In this example, the optional "Total Length Of Attribute" specifies the length of the string, both in fixed or variable lengths. In one example, "C[5]" represents an alphabets or character string consisting of five characters in length. Variable length can be specified using a range including the minimum and maximum number of characters such as "C[min-max]" where "min" is the minimum number of characters and "max" represents the maximum number of characters allowed. Accordingly, in this example, "C[5-10]" represents an alphabets or character string having a total length from five to ten characters. Additionally, in this exemplary constraint representation syntax, when include, not-include, or position related constraints/properties are included in a representation, as discussed and illustrated in detail below, the "Total_Length_Of_Attribute" must be specified.

In this exemplary constraint representation syntax, an optional "include" field can be used to specify a permissible set of characters, numerals, and/or special characters as specified by the one or more properties associated with one or more of the extracted attributes. In one example, the permissible set of characters can be included in the representation as prefixed by an "i". In this example, "C[5, i(A-Z)]" represents an alphabets or character strings consisting of five uppercase characters only. Accordingly, in this exemplary constraint representation syntax, "C[5, i(A-Z)]" and "CC[5]" are equivalent representations as are "C[5, i(a-z)]" and "CS[5]".

In this exemplary constraint representation syntax, an optional "not-include" field can be used to specify a non-permissible set of characters, numerals, and/or special characters, as specified by the one or more properties associated with one or more of the extracted attributes. In one example, the non-permissible set of characters can be included in the representation as prefixed by a "ni". In this example, "C[5, ni(A-D)]" represents an alphabets or character string consisting of five characters of the default full set of characters or alphabets with the exception of uppercase characters in the range from A to D.

In this exemplary constraint representation syntax, an optional "position" field can be used to specify a particular syllable or set of characters, numerals, and/or special characters that must be included at a specified position(s) in the string, as specified by the one or more properties associated with one or more of the extracted attributes. In one example, the position, and the characters, numerals, and/or special characters required to be present at the position, can be in included in the representation as prefixed by a "p". In this example, "C[5, p1->R]" represents an alphabets or character string consisting of five characters wherein the first character must be an uppercase "R".

Additionally, an optional "~" can be used proximate the "p" prefix to represent a set of characters, numerals, and/or special characters that are not permitted to be located at the specified position, as specified by the one or more properties associated with one or more of the extracted attributes. Accordingly, in this example, "A[5-6, C[3-4], S[2, p~1]]" represents an alphanumeric string of five to six characters, three to four of which are alphabets and two of which are special characters wherein neither of the special characters can be the first character of the alphanumeric string.

Also optionally, repetitive sets of characters can be specified by prefixing a string by an integer representing the number of repeating characters. In one example, an "IP_address" attribute has associated properties requiring three sets of 1-3 numbers, each of which is followed by a decimal or period special character. Following the repeating sets, a fourth set of 1-3 numbers is included. Accordingly, in this example, "A[3(N [1-3] S[1 i.]), N[1-3]]" can be used to represent the properties of the "IP address" attribute and the number "3" prefix indicates the repetitive sets. This exemplary representation requires an alphanumeric string with three sets of numbers of 1-3 digits each followed by a string of one special character, specified by the "include" field as the "." character, and followed by another number of 1-3 digits.

In order to generate, at step 202, the plurality of constraints based on the representations of the data types and the one or more properties of the extracted attributes, a syntax can be used such as, "[attributeName] <C> [properties as represented based on the constraint representation syntax]". Accordingly, the constraints can be a representation of the relationship between a name of an extracted attribute and the data type and/or one or more properties of the extracted attribute. In the event two or more attributes have the same the data type and/or one or more properties, a constraint can be generated wherein the two or more attribute names are specified as separated by a "," such as "FName, LName <C> A[6-9]", for example.

In one example, a software requirement specification specifies a "password" attribute that is an input variable representing a password input by a user of the software, such as during a registration process. In this example, the software requirement specification additionally specifies the following properties for the "password" attribute:
 [1] The password is an alphanumeric string with a combination of alphabets, numbers, and special characters.
 [2] The password must have a minimum of 8 and a maximum of 12 characters in length.
 [3] The password must consist of at least two numerals.
 [4] The password must have two special characters.
 [5] The permissible set of special characters are #, $, %, ^, &, *, and @.
 [6] The password must not contain any blank spaces.
 [7] The first character of the password must be a capital letter.

In this example, at step 202, the test data generation computing apparatus can generate a constraint for the "password" attribute based on the exemplary constraint representation syntax described and illustrated herein. Accordingly, an exemplary constraint generated in step 202 for the "password" attribute can be "password <C> A[8-12, C[p1->A-Z], N[2-10], S[2,i(#,$,%,^,&,*,@)]]".

At step 204, the test data generation computing apparatus 12 outputs the plurality of constraints generated in step 202. The outputting can be to the client computing device 14 or to the memory 20, for example. Optionally, the plurality of constraints can be used to in model-based test input data generation as described and illustrated in detail with respect to steps 206-214.

At step 206, the test data generation computing apparatus 12 generates a model representing one or more use cases specified by the software requirements specification. In some examples, the test data generation computing apparatus 12 parses the software requirement specification to extract the use cases and generate the model. In other examples, the test data generation computing apparatus 12 generates the model based on information obtained from a user of the client computing device 14 including behavior, use cases, scenarios, and/or flows of the software, as specified in the software requirements specification.

In this example, the model includes a plurality of paths including one or more conditional nodes associated with one or more of the plurality of constraints. Optionally, the model is a uniform modeling language (UML) structured use case activity diagram (UCAD) including at least one start node and at least one end node. Each path can include one of the start nodes and one of the end nodes or one of the start nodes and a cycle or loop, although other path definitions can be used.

Figure 4:
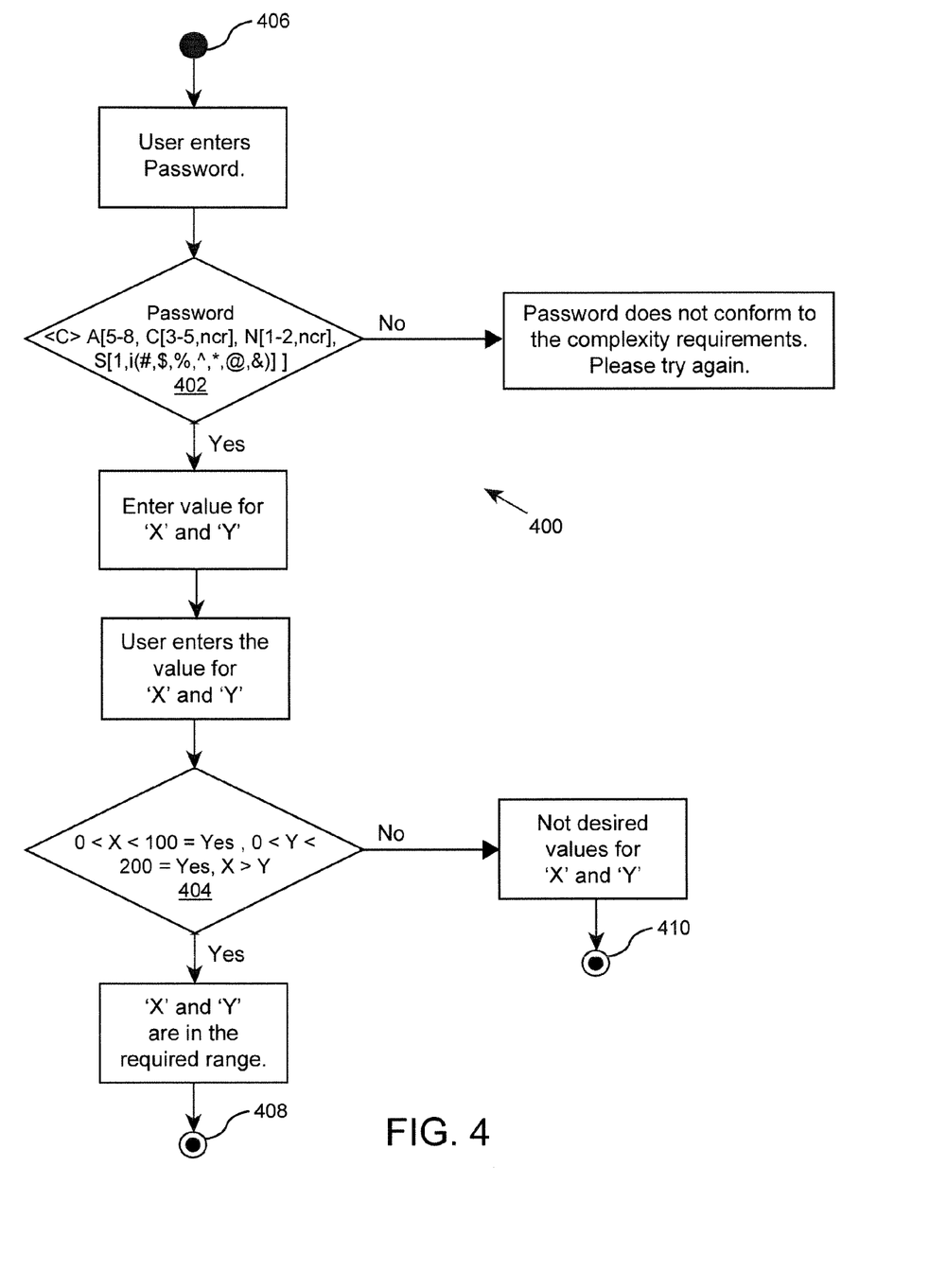
FIG. 4 is an exemplary model generated by the exemplary test data generation computing apparatus of FIG. 1.

Referring to FIG. 4, an exemplary model 400 generated by the test data generation computing apparatus 12 is shown. The model 400 includes a start node 406 and two end nodes 408 and 410 and represents an exemplary registration process of a software application. In the exemplary registration process represented by the model 400, a user enters a password and, when authenticated, the user enters two additional values (X and Y in this example) in order to gain access. The model also includes two exemplary conditional nodes 402 and 404. The constraint representing the "password" attribute and associated properties, as described and illustrated earlier, has been inserted by the test data generation computing apparatus 12 at conditional node 402. In some examples, the model can include conditions that are not represented as constraints in the constraint representation language but are in a machine readable format such as the conditions specified in conditional node 404.

At step 208, the test data generation computing apparatus 12 generates test input data for one of the plurality of paths included in the model generated in step 204. The test input data is generated based on the constraints inserted into the model and associated with one or more conditional node(s) included in the path. Accordingly, in one example, the test data generation computing apparatus 12 traverses the path to extract the encountered constraints, which are represented in a machine readable format based on the constraint representation syntax. The extracted constraints can form a path predicate associated with at least one path. Optionally, the test data generation computing apparatus 12 validates the constraints by determining whether the constraints include proper constraint representation syntax that is able to be effectively interpreted.

In one example, the test data generation computing apparatus 12 can apply a boundary value, equivalence partitioning, or a genetic algorithm test input data generation technique based on the path predicate and/or extracted constraints in order to generate the test input data for the one path. One exemplary genetic algorithm is described herein, although other genetic algorithms and other test input data generation techniques can be used.

In this exemplary genetic algorithm, it is assume that the constraint representation syntax of the path predicate has been parsed by the test data generation computing apparatus 12 and the predicate indicates three conditions including that input variable attributes "x" and "y" must be greater than zero and "x" must be greater than "y". Accordingly, in a first step, the test data generation computing apparatus 12 generates an initial population of a random size including randomly generates integers for each of the attributes. In this example the initial population is five and the randomly generated integers for each set ("x", "y") of the five are (−9, 4), (3,8), (−1,9), (−2,−3), and (0,4).

In a second step, the test data generation computing apparatus 12 generates a fitness value for each individual set of the population based on how many of the conditions specified by the predicate are satisfied. Exemplary individual sets of the population, conditions, and fitness values for this example are shown in Table 2.

TABLE 2

| Individual | Condition 1 (x > 0) | Condition 2 (y > 0) | Condition 3 (y > 0) | Fitness |
|---|---|---|---|---|
| (−9, 4) | NO | YES | NO | 1 |
| (3, 8) | YES | YES | NO | 2 |
| (−1, 9) | NO | YES | NO | 1 |
| (−2, −3) | NO | NO | YES | 1 |
| (0, 4) | NO | YES | NO | 1 |

In a third step, the test data generation computing apparatus 12 selects individuals such that individuals with a higher associated fitness value are more likely to be selected and randomly generates two new individual sets. Accordingly, in this example, (3,8) is selected as it has the highest fitness value and satisfies the highest number of conditions. Randomly, (0,4) is also selected to be combined with (3,8) to produce (3,4) and (−1,9) is selected to be combined with (3,8) to produce (−1,8).

In a fourth step, the test data generation computing apparatus 12 applies a mutation based on a mutation probability (e.g. 0.25) to each of the generated two new individual sets to generate two new individual sets. In this example, the resulting individual sets can be (3,3) as mutated from (3,4) and (−1,8) as mutated from (−1,8). As a result of the mutation probably, in this example, one of the individual sets was unchanged in this step.

With the mutated individual sets, in a fifth step, the test data generation computing apparatus 12 generates a new population. Optionally, the three individual sets with the highest fitness value are combined with the two mutated individual sets to form the second population. In this example, the mutated sets (3,3) and (−1,8) are combined with (3,8) which has the highest fitness value in the initial population and (−9,4) and (−1,9) which are chosen randomly since the remaining sets of the initial population have the same fitness value.

Optionally, the second through fifth steps can be repeated until an specified number of iterations are performed or until an individual set satisfies the path predicate and the population has converged. In one exemplary operation of the exemplary genetic algorithm described herein, in an additional two iterations of the second through fifth steps, the test data generation computing apparatus 12 generates a population which has converged based on the (5,4) set satisfying the path predicate, as shown in Table 3.

TABLE 3

| Individual | Condition 1 (x > 0) | Condition 2 (y > 0) | Condition 3 (y > 0) | Fitness |
|---|---|---|---|---|
| (−9, 4) | NO | YES | NO | 1 |
| (3, 8) | YES | YES | NO | 2 |
| (3, 3) | YES | YES | NO | 2 |
| (5, 4) | YES | YES | YES | 3 |
| (3, 3) | YES | YES | NO | 2 |

At step 210, the test data generation computing apparatus 12 optionally stores the generated test input data such as in the memory 20. The test input data can be stored in a database, a spreadsheet, and/or a hypertext markup language (HTML) document, for example, although any other output location and format can be used. Additionally, the generated test input data can be sent by the test data generation computing apparatus 12, using the network interface device 22, to the client device 14 over the communication network 16.

At step 212, the test data generation computing apparatus 12 determines whether there are more paths in the model generated in step 206 for which test input data has not been generated in step 210. One or more of the paths included in the model can be identified by the test data generation computing apparatus 12 by applying a depth first search algorithm. If the test data generation computing apparatus 12 determines there are more paths in the model, the Yes branch is taken to step 208.

Optionally, steps 208-212 are repeated for all paths included in the model, although test input data can be generated for only a subset of the paths included in the model. Accordingly, when the test data generation computing apparatus 12 determines, at step 212, that test input data has been generated, at step 210, for all or a specified number of paths such that there are no additional paths, the No branch is taken to step 214.

At step 214, the test data generation computing apparatus 12 optionally tests the software developed based on the software requirement specification model using the generated test input data. In some example, the test input data is stored and/or output by the test data generation computing apparatus 12 at step 208 and used by another computing device and/or the user of the client computing device 14 to test the software.

Figure 5:
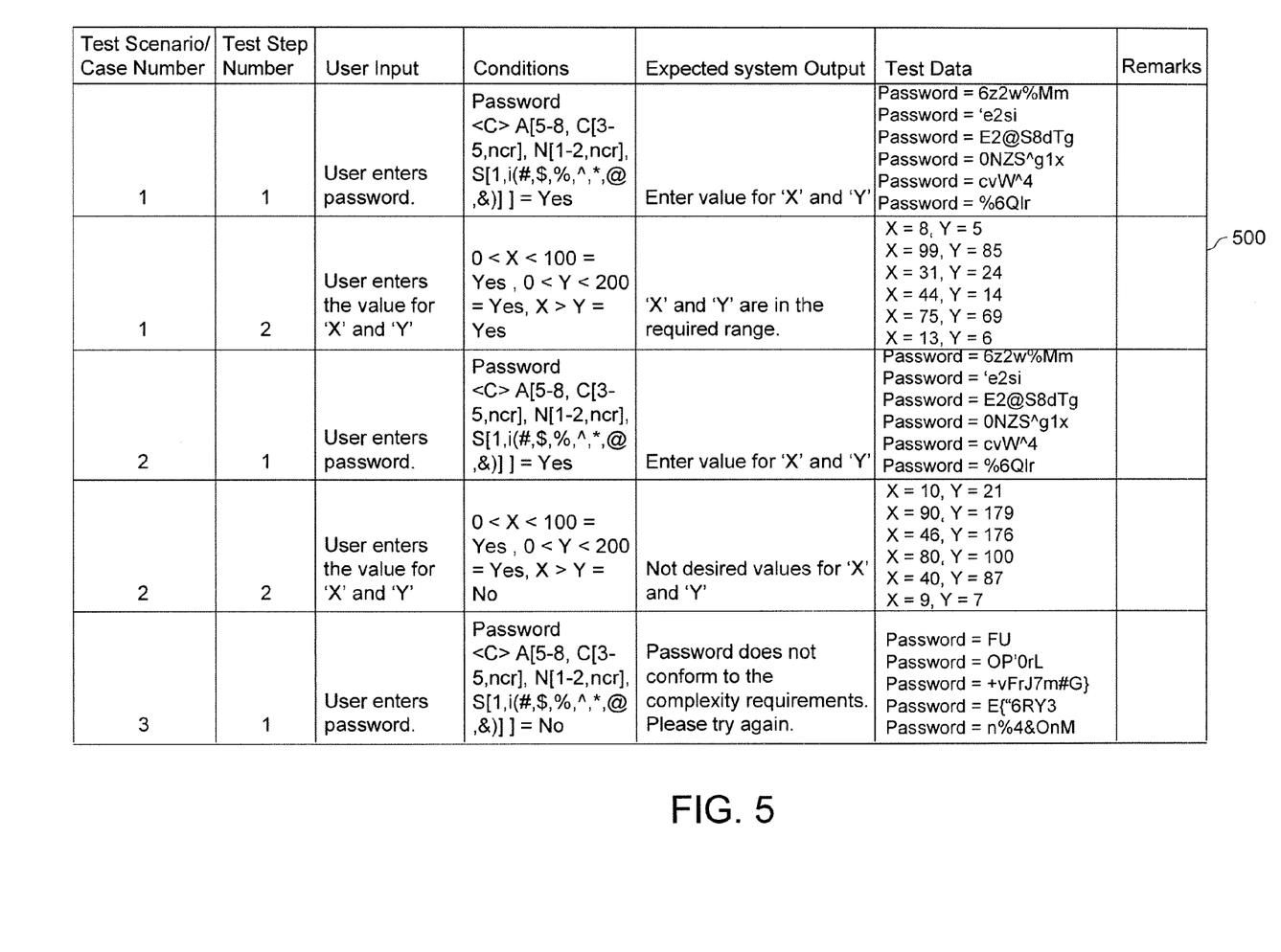
FIG. 5 is a table including exemplary test input data generated by the exemplary test data generation computing apparatus of FIG. 1 based on the exemplary model of FIG. 4.

Referring specifically to FIG. 5, a table 500 is shown as including exemplary test input data generated by the test data generation computing apparatus 12 based on the exemplary model 400 shown in FIG. 4 and the genetic algorithm described and illustrated earlier. In this example, model 400 includes three paths corresponding to the three test scenarios identified in table 500. In the first scenario, the password constraint of the conditional node 402 is satisfied and the conditions in the conditional node 404 are also satisfied. In the second scenario, the password constraint of the conditional node 402 is satisfied but the conditions in the conditional node 404 are not satisfied. In the third scenario, which only requires one test step, the password constraint of the conditional node 402 is not satisfied and, in the path associated with this scenario, the conditional node 404 is not traversed.

The exemplary test input data shown in table 500, and generated by the test data generation computing apparatus 12, is comprehensive with respect to every scenario of the registration system software modeled in model 400. The test input data in table 500 includes data that satisfies and does not satisfy every encountered constraints and/or conditions for every possible path in the model 400 thereby providing a test input data set that allows for effective testing of the software.

By this technology, more effective and comprehensive test input data capable of testing all use cases and behaviors of a software product can be automatically generated. As a result, fewer resources are required to generate software test input data and software can be more effectively tested resulting in higher quality software with fewer bugs and defects.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for generating software test input data, comprising:
   extracting, by a test data generation computing apparatus, a plurality of attributes and a data type and one or more properties of each of the attributes from a software requirements specification;
   applying, by the test data generation computing apparatus, constraint representation syntax to the attributes based on the data type and the one or more properties associated with each of the attributes to generate a plurality of constraints, wherein the constraint representation syntax is a machine readable format;
   generating, by the test data generation computing apparatus, a model representing one or more use cases, the model comprising one or more conditional nodes and including one or more of the constraints as associated with each of the one or more conditional nodes;
   identifying, by the test data generation computing apparatus, a plurality of paths included in the model; and
   applying, by the test data generation computing apparatus, a test input data generation technique to generate test input data for each of the paths based on the one or more constraints associated with the one or more conditional nodes of each of the paths.

2. The method of claim 1 wherein the applying the constraint representation syntax further comprises generating a representation for each attribute associated with a string data type, a numeric data type, and a Boolean data type.

3. The method of claim 2 wherein the representation for each attribute associated with the string data type includes:
   a string identifier associated with one subtype of the string data type selected from an alphanumeric string, a character string including only alphabets, a character string including only uppercase alphabets, a character string including only lowercase alphabets, a character string including special characters, and a date string; and
   one or more of a length field, an include field, a not-include field, a position field, or one or more representations of one or more portions of the string attribute.

4. The method of claim 2 wherein the representation for each attribute associated with the numeric data type further includes a numeric identifier and one or more of a length field or a decimal field.

5. The method of claim 1 further comprising testing, by the test data generation computing apparatus, software developed based on the software requirements specification using the generated test input data.

6. A non-transitory computer readable medium having stored thereon instructions for generating software test input data comprising executable code that when executed by the processor cause the processor to perform steps comprising:
   extracting a plurality of attributes and a data type and one or more properties of each of the attributes from a software requirements specification;
   applying constraint representation syntax to the attributes based on the data type and the one or more properties associated with each of the attributes to generate a plurality of constraints, wherein the constraint representation syntax is a machine readable format;
   generating a model representing one or more use cases, the model comprising one or more conditional nodes and including one or more of the constraints as associated with each of the one or more conditional nodes;

identifying a plurality of paths included in the model; and applying a test input data generation technique to generate test input data for each of the paths based on the one or more constraints associated with the one or more conditional nodes of each of the paths.

7. The medium of claim 6 wherein the applying the constraint representation syntax further comprises generating a representation for each attribute associated with a string data type, a numeric data type, and a Boolean data type.

8. The medium of claim 7 wherein the representation for each attribute associated with the string data type includes:

a string identifier associated with one subtype of the string data type selected from an alphanumeric string, a character string including only alphabets, a character string including only uppercase alphabets, a character string including only lowercase alphabets, a character string including special characters, and a date string; and one or more of a length field, an include field, a not-include field, a position field, or one or more representations of one or more portions of the string attribute.

9. The medium of claim 7 wherein the representation for each attribute associated with the numeric data type further includes a numeric identifier and one or more of a length field or a decimal field.

10. The medium of claim 6 further having stored thereon instructions that when executed by the processor cause the processor to perform steps further comprising testing software developed based on the software requirements specification using the generated test input data 11. An apparatus for generating software test input data, comprising a processor coupled to a memory and configured to execute programmed instructions stored in the memory comprising:

extracting a plurality of attributes and a data type and one or more properties of each of the attributes from a software requirements specification;

applying constraint representation syntax to the attributes based on the data type and the one or more properties associated with each of the attributes to generate a plurality of constraints, wherein the constraint representation syntax is a machine readable format;

generating a model representing one or more use cases, the model comprising one or more conditional nodes and including one or more of the constraints as associated with each of the one or more conditional nodes;

identifying a plurality of paths included in the model; and applying a test input data generation technique to generate test input data for each of the paths based on the one or more constraints associated with the one or more conditional nodes of each of the paths.

12. The apparatus of claim 11 wherein the applying the constraint representation syntax further comprises generating a representation for each attribute associated with a string data type, a numeric data type, and a Boolean data type.

13. The apparatus of claim 12 wherein the representation for each attribute associated with the string data type includes:

a string identifier associated with one subtype of the string data type selected from an alphanumeric string, a character string including only alphabets, a character string including only uppercase alphabets, a character string including only lowercase alphabets, a character string including special characters, and a date string; and one or more of a length field, an include field, a not-include field, a position field, or one or more representations of one or more portions of the string attribute.

14. The apparatus of claim 12 wherein the representation for each attribute associated with the numeric data type further includes a numeric identifier and one or more of a length field or a decimal field.

15. The apparatus of claim 11 wherein the processor is further configured to execute programmed instructions stored in the memory further comprising testing software developed based on the software requirements specification using the generated test input data.

* * * * *